Patented July 24, 1951

2,562,020

UNITED STATES PATENT OFFICE 2,562,020

PROCESS FOR PREPARING METALLIC RESINATES

Harry D. Darlington, Hackensack, N. J., assignor to Sun Chemical Corporation, New York, N. Y., a corporation of Delaware No Drawing. Application February 21, 1948, Serial No. 10,172

10 Claims. (Cl. 260—99.5)

This invention relates to metallic resinates and more particularly to a method of preparing such compounds by fusion reactions.

Among the many commercial applications of rosin and rosin containing polymers are their use in paint and varnish formulations and as binder materials and extenders for other resinous materials in printing inks. However, the use of these resinous materials in these fields is limited to a great extent due to several undesirable properties characteristic of the resins and of films formed by varnishes and inks containing these resins. Such varnish films, while initially exhibiting a high gloss, are weak and readily affected by weather and moisture conditions which quickly destroy the gloss and cause the films to whiten and crack. Utilized in printing inks, rosin and rosin containing polymers have poor rub-proof qualities in the printed film and when used in water miscible ink systems are generally affected by high humidity conditions during printing operations to the extent of precipitation of the resin on the printing rollers. Furthermore when certain pigments of a basic nature are dispersed in such resinous vehicles, a thickening of the vehicle, known in the art as livering, occurs over a period of time due to the acidic nature of rosin and its polymers.

These undesirable characteristics of rosin and its polymers have been overcome by treating these resins in a molten state with the oxides or hydroxides of metals to form resin-like products having new and improved properties. These reactions are known as fusion reactions in which a certain percentage of the acids normally occurring in rosins are neutralized by such metallic compounds at temperatures substantially above the melting point of the rosin, there also occurring a simultaneous liberation of water. The resins thus formed are termed resinates and are characterized by higher melting points, lower acid numbers, increased hardness and superior gloss of films of such resins, greater resistance to oxidation of such films, increased flow of varnishes and inks made with such resins and a minimum tendency toward livering by such compositions.

However, metallic resinates prepared by ordinary fusion methods, when employed in the solvents commonly utilized in preparing varnishes and ink vehicles, and in the proportions satisfactorily required for such compositions usually contain an amount of material insoluble in such solvents to a degree which is undesirable and even detrimental for satisfactory commercial applications. The presence of such insoluble material in printing inks has an abrasive action on printing plates during printing operations, causing scratching of the surface and excessive wear of such plates. The minute particles of insoluble material also have a tendency to become lodged in the indentations of the screens of printing plates resulting in fill-up of the plates which commonly is the cause of specking in the prints. Such undesirable characteristics may occur even when the amount of insoluble material in such compositions is found to be as low as 0.5 part by weight per 100 parts of the particular resinate utilized.

The amount of insoluble material permissible in metallic resinates utilized in printing ink formulations generally is determined by the type of printing in which such inks are employed, and by the effect of such insoluble material upon the printing operation and upon the printed matter. For example, in typographic printing where fine half-tones are utilized in making reproductions, insoluble material in the printing ink will cause fill-up of the printing plate, as noted above, and result in specking of the printed matter. An excess of such insoluble material in printing ink also has an abrasive action upon the rollers which distribute and feed the ink to the printing plate, and upon the printing plate itself. This, in time, results in a roughening of the rollers and consequent poor distribution, and the application of an uneven film of ink to the printing surfaces. Furthermore the wear on the printing plate results in poor, untrue and hazy reproductions. It has been found that such conditions as are described above are avoided when the percentage of insoluble material present in printing inks utilizing metallic resinates as the binder component of such inks is not greater than 0.2 per cent by weight per 100 parts of the resinate employed.

Operations such as filtration and centrifuging are often employed in the varnish and ink-making industries to separate and remove from such compositions material which is insoluble in the solvents commonly utilized in preparing such compositions. However, in many instances where these compositions are fairly viscous, such operations are difficult to accomplish and often do not result in complete clarification, with the result that a certain percentage of the material causing the undesirable results noted above is not eliminated. Furthermore the requirements of many types of printing operations necessitate the use of inks of so high a viscosity as to preclude the possibility of centrifuging or filtering such ink compositions or their vehicles even under high pressures. Consequently it is desirable in order to avoid the conditions resulting due to the presence of such insoluble material in printing inks, to eliminate as much of such material occurring in the metallic resinates utilized in preparing printing inks and it is a purpose of the present invention to provide by fusion reactions metallic resinates which are substantially free of insoluble material.

By the terms "insoluble material," or "insolubles," as used in the present invention are meant the impurities normally occurring in metallic resinates as a consequence of the reaction between rosin, or rosin containing polymers, and an oxide or hydroxide of a metal, which impurities are insoluble in the liquid components commonly utilized to dissolve such metallic resinates in the preparation of varnishes and ink vehicles. Typical of such liquid components are the petroleum hydrocarbon solvents comprising that group within the boiling range of 240 and 310° C., and having a kauri-butanol value below 30.

By the term kauri-butanol value is meant the solvent power value of a petroleum solvent determined according to the kauri-butanol test, which is a standard test adopted in certain branches of the chemical industry to evaluate the solvent power characteristics of various petroleum solvents. A description of the kauri-butanol test may be found in the Barmeier Patent No. 2,325,297 which relates to printing inks utilizing as liquid carrier components the above mentioned petroleum hydrocarbon solvents having kauri-butanol values below 30.

Other such solvents may include the lower boiling, more highly volatile petroleum hydrocarbons such as V. M. & P. naphtha, mineral spirits and kerosene; the aromatic coal tar fractions such as benzene, toluene, xylene and the like; and those esters, glycols and glycol ethers in which metallic resinates are ordinarily soluble.

In making my determinations of the amount of insoluble material present in the metallic resinates of the present invention, I have utilized as a standard for solubility of the said metallic resinates, a petroleum hydrocarbon with a boiling range of 300–310° C. and a kauri-butanol value of approximately 25.

This solvent has been selected as the standard for the determination of the amount of insoluble material contained in the metallic resinates of the present invention because of the low solvent power value of this particular solvent as compared to the solvent power values of such other solvents as are mentioned above.

As a method for making such a determination of the amount of insoluble material contained in a metallic resinate, a weighed sample of the resinate is heated to solution in the above mentioned standard solvent. The solution is pressure filtered through a Buchner funnel prepared with a layer of asbestos fibers which is weighed before filtration. The funnel is of such a size that when fully loaded it can be weighed to 0.01 gram. The solution is conveniently fed to the funnel for filtration from a separatory funnel arranged for automatic flow. The empty solution container and the separatory funnel are then washed with toluol, the wash being drained through the Buchner funnel, which is then also washed with toluol, dried and reweighed. The difference in weight of the Buchner funnel before and after filtration is the actual amount of insoluble material present in the original weighed sample of the resinate employed. To calculate the percentage of insoluble material contained in the particular metallic resinate so tested, it is necessary merely to divide the actual weight of the insoluble material, obtained and determined by the method described above, by the weight of the sample of metallic resinate employed and to multiply the resultant quotient by one hundred.

One reason for the presence of such insoluble material in metallic resinates formed by ordinary fusion reactions is the presence of impurities contained in the particular metallic compound used to neutralize the rosin, or rosin containing polymer, which impurities are unreactive with rosin at fusion temperatures. Therefore, to obtain a clear resinate containing a minimum amount of insoluble material, the purity of the metallic compounds utilized in the reaction must be considered. Normally there are present in hydrated lime, for example, small amounts of such compounds as silica, silicates, calcium sulfate and carbonate, and the oxides of iron and aluminum, all of which are unreactive with rosins. The percentage of such impurities may be as high as 5% of the lime. Furthermore calcium carbonate, which may be present in a small amount when hydrated lime is packaged, is also formed during storage and transit by the addition of carbon dioxide from the atmosphere and may itself exceed 5% of the lime. This reduces the neutralizing power of the lime and increases the amount of material unreactive with rosin in fusion reactions. Magnesium oxide is also usually present in hydrated lime in small amounts but this material is reactive with rosin at fusion temperatures and therefore will have no effect upon the amount of insolubles contained in the calcium resinate formed by such reactions.

I have found that a lime containing 97% available calcium hydroxide, as determined by the A. S. T. M. method C-25-44 does not contain an excess of material unreactive with rosin and may satisfactorily be utilized in preparing metallic resinates containing a minimum amount of insolubles. Similarly, the standard of purity regarding the amount of insoluble material permissable in lime may be satisfactorily applied to the oxides and hydroxides of other metals.

Therefore one object of the present invention is to provide a method of preparing metallic resinates by fusion reactions in which the insolubles content of such resinates approximates the content of material unreactive with rosin and rosin containing polymers contained in the oxides and hydroxides of the metals, when such metallic compounds conform to the standards of purity for such compounds as set forth above.

The insoluble material occurring in metallic resinates formed by ordinary fusion reactions has also been found to be partly due to the presence of a certain percentage of the metallic compound which has not reacted with the rosin acids due to non-completion of the reaction. Therefore, another object of the present invention is to provide a method of preparing metallic resinates by fusion reactions in which substantially all the available neutralizing material contained in the metallic compounds utilized in such reactions has reacted with the rosin, or rosin containing polymers.

Before outlining the procedure by which such complete fusion reactions may be obtained, it is necessary to mention several factors limiting the extent of the neutralization possible of the acids present in rosin and rosin containing polymers. It has been found that normally the addition of the metallic compounds employed to form metallic resinates in an amount up to 8% of the weight of the rosin to be reacted forms resin-like products which are clear and are relatively soluble in ordinary varnish and ink oils and solvents. As the metal content is increased, however, there is formed in the fused mass a colloidal suspension of the specific metal compound utilized, which increases the viscosity of the melt to such an extent that the temperature needed to keep the mass liquid is above the point at which decomposition of the resinate begins. Furthermore a complete or nearly completely neutral resinate may be only partly soluble in the ordinary solvents employed in varnishes and printing inks. This fact alone would frustrate the original purpose of such fusion operation. Therefore it will be understood that the application of my invention to such operations will be governed by the conditions described above.

The difficulties encountered in completely reacting the metallic compounds and the rosins in fusion reactions may be overcome to a certain extent by the use of a catalyst, such as described in the Romaine et al. Patent No. 1,884,407. The function of such an agent is to convert the unreacted metal compound into compounds which are reactive with rosin which in turn react with the rosin acids to form additional resinate with the subsequent reformation of compounds reactive with the metallic compounds for repetition of the process. One class of catalysts generally utilized in these reactions comprise the organic acids soluble in rosin at the reaction temperature whose acidity is due to a carboxylic acid radical. Representative of this class is acetic acid. The anhydride of acetic acid, and metal salts of acetic acid corresponding to the particular metallic compounds utilized in the neutralization of the rosin may also be employed.

To be effective in carrying the reaction to the point where all the available neutralizing material contained in the metallic compounds has been reacted with the rosin acids, the catalyst must be present throughout the fusion mass till the required end point has been reached. However, numerous difficulties are encountered in the introduction of such catalysts to the reaction mixture and in maintaining such catalysts in the reaction mixture in an effective state. Acetic acid added to the surface of the melt immediately vaporizes and very little is able to penetrate the mass. Addition of the acetate directly to the mixture causes the salt to ball and float to the top, thereby losing its effectiveness as a catalyst and prolonging the duration of the reaction. To prevent such balling of the acetate, it has been mixed with the lime, or other metal compound utilized, together with water or a suitable liquid vehicle to form a paste, as described in Palmer and Edelstein, Patents Nos. 2,346,993 and 2,346,994, and added as such to the molten mass. While increasing the effectiveness of the catalyst and preventing the formation of lumps in the melt, addition of the catalyst prior to or simultaneously with the lime does not reduce the content of the insoluble material of the resinate thus formed to the preferred minimum content.

I have found that if the catalyst is added to the reaction mixture at the bottom of the kettle after the reaction has been 80-95% completed a substantially complete reaction is obtained with a resulting fusion product in which the actual insolubles content approximates the calculated amount of the compounds not reactive with the rosin acids, which are contained in the metal compound utilized in the reaction.

I have also found that when the catalyst is inserted at the bottom of the reaction mass, its efficiency increases in proportion to the distance it travels through the batch; that is, the distance from the point of insertion of the catalyst into the melt to the surface of the said melt. This is aptly demonstrated by the fact that the acid to resin ratio of 0.03 to obtain not quite a complete reaction in a 15 pound batch where the distance from the point of insertion of the catalyst into the melt to the surface of the melt was approximately 4 to 5 inches was reduced to 0.015 to get a complete reaction in a 1500 pound batch where the distance from the point of insertion of the catalyst into the melt to the surface of the melt was approximately 4 to 5 feet.

The amount of catalyst required will vary with respect to the batch size, the kettle size, the percentage of metallic compound utilized in the reaction, and the distance from the point of insertion of the catalyst into the reaction mixture to the surface of the melt.

However an amount of catalyst between approximately 0.8 and 2.0 parts by weight based on the weight of the resin has been found to be satisfactory in carrying out my invention.

I have also found that when rosin containing polymers which are subject to strict control conditions as regards the degree of polymerization, melting points, and acid and saponification numbers are subjected to fusion reactions with the metallic compounds utilized in such reactions according to the conditions outlined in the present invention, metallic resinates are formed which are substantially free of insoluble matter and which have a uniformity of melting points and acid and saponification numbers not normally obtained by ordinary fusion reactions. Furthermore the degree of neutralization of such rosin containing polymers required to yield resinates having a uniform solution viscosity in a standard solvent at a constant solids content and at a standard temperature may be determined accurately and used as a constant in preparing such resinates. The rosin containing polymers utilized in carrying out the present invention are a series of polymers known as "Polypale resin," a product of Hercules Powder Co., which are resins obtained by treating natural rosin to cause about ⅓ of the rosin acids present, such as abietic and pimaric, to unite as polymers, the remaining ⅔ of the rosin constituents remaining unchanged. Similarly, other rosin containing polymers may be treated according to the process as outlined in the present invention to form resinates having correspondingly similar properties as set forth above.

In carrying out my invention, 100 parts by weight of rosin, or rosin containing polymer are charged to a reaction kettle and heating is begun. By slow and careful heating, a clear melt is obtained at 425° F. When the temperature has reached 450° F. about 6 parts by weight of hydrated lime based on the weight of the rosin are slowly added to the molten resin with agitation to prevent balling of the lime. Addition of the lime should be complete by the time the temperature has reached 500° F. When a practically clear melt has been obtained, approximately 1.5 parts by weight of glacial acetic acid based on the weight of the rosin are slowly introduced into the molten resin at a point near the bottom of the kettle.

This is satisfactorily accomplished through a supply vessel which is connected to an entry tube which extends down into the kettle to a point near the bottom of the kettle. The acid is gravity fed to a measuring tank where the required amount occupies approximately half the capacity. A low air pressure is supplied and adjusted, and the source of air closed. Opening the feed line to the kettle then permits only so much acid to flow as will equalize the pressure, and this increment is further controlled by means of a valve. The process is repeated till the required amount of acid has been utilized.

In adding the acid it is desirable that it be added very slowly and a minimum amount used due to the fumes produced and to the burst of gas which would be caused by the introduction of a more or less solid stream of acid into the hot resin. As the resin temperature at that stage is far above the boiling point of the acid, there is immediate vaporization. If one massive bubble were formed there would be danger of overflowing the kettle. The finer the dispersion of the acid, the more efficient is its use.

The batch should be complete and free of acid about ten minutes after addition of the acid has been completed with the quantities above described. The calcium resinate formed by the process as outlined above, upon analysis, is found to have an insolubles content of less than .2% if the purity of the lime utilized in the reaction has complied with the standard as set forth above. The insoluble material content of the resinate will also be found to approximate the theoretical content of material unreactive with rosin acids contained in the lime utilized in the reaction.

This is aptly demonstrated in the following table illustrating the results obtained in three separate fusion reactions carried out according to the present invention.

| Lbs. Resin | Lbs. Acid | Acid/Resin | Per cent of Insolubles | |
|---|---|---|---|---|
| | | | Theoretical | Actual |
| 1,500 | 12 | .008 | .06 | .14 |
| 1,500 | 16 | .010 | .08 | .10 |
| 1,500 | 24 | .015 | .08 | .08 |

The above table represents the reaction between 100 parts of rosin or rosin containing polymer and between approximately 5.5 to 7 parts of hydrated lime conforming to the standard of purity for such compounds as set forth above, under reaction conditions substantially the same as those set forth in the illustrative example above.

The following table demonstrates the amount of lime required to neutralize 100 parts of several "Polypale" resins of various melting points and acid numbers, according to the present invention, to form calcium resinates meeting the specifications of a uniform viscosity of 75 poises at 25° C. and at 50% solids in a petroleum hydrocarbon solvent (B. P. 300-310° C.) the resinates having a melting point of 140°±6° C. with insolubles less than 0.2%. The resulting percentage of neutralization of these resins is also set forth.

| Polypale Resin | | Amount of Lime used per 100 parts resin | Per cent Neutralization | Melting Point Calcium Resinate |
|---|---|---|---|---|
| Melting Point | Acid No. | | | |
| ° C. | | Parts | | ° C. |
| 77 | 149.2 | 6.75 | 66 | 139.5 |
| 79 | 147.7 | 6.4 | 64 | 139.9 |
| 80 | 145.3 | 6.1 | 62 | 140.4 |
| 81 | 142.6 | 5.9 | 60 | 141.9 |
| 82 | 139.6 | 5.6 | 59 | 146 |

The amount of acetic acid utilized as the catalyst in preparing the calcium resinates set forth in the above table is satisfactorily maintained at approximately 1.5 parts per 100 parts of Polypale resin neutralized.

By following the procedure as outlined above and utilizing the oxides or hydroxides of the corresponding metals, resinates of zinc, manganese, aluminum, barium, magnesium, strontium, cadmium and lead may be prepared which are substantially free of insoluble material as defined in the present invention. The percentage of metal which may be reacted with the rosin acids will vary depending upon the particular metal utilized and the particular rosin or rosin containing polymer employed in preparing these resinates. However, to achieve the desired results of the present invention, the percentage of the metallic compound which may be utilized in preparing resinates of the above mentioned metals by such a fusion reaction as is described in the present invention will be governed by the conditions set forth hereinbefore.

Calcium acetate may satisfactorily be substituted for acetic acid as the catalyst in the operation as outlined above. Introduction of the acetate into the molten mass may satisfactorily be accomplished by means of a helical screw conveyor which extends into the kettle to a point near the bottom.

Other materials which may be satisfactorily utilized as catalysts in carrying out my invention include inorganic acids, such as hydrochloric acid, which react with the metallic compounds at fusion temperatures to form compounds reactive with rosin; organic compounds which react with the neutralizing material at fusion temperatures to form compounds reactive with rosin, said organic compounds comprising the phenolic acids; and such salts of organic acids which react with rosin at fusion temperatures to form resinates of the metal contained in such salts and at the same time form the corresponding acids which react with the neutralizing agent to form compounds reactive with rosin.

While the above products and processes of making the same constitute preferred embodiments of the invention changes may be made therein without departing from the scope of the invention as defined in the appended claims.

What is claimed is:

1. In the process of preparing a metallic resinate by reacting rosin with a metallic compound selected from the group consisting of the oxide and hydroxide under molten conditions and in the presence of a catalyst selected from the group consisting of acetic acid, acetic anhydride and metal salts of acetic acid, the improvement which consists in adding the catalyst to the reaction mixture only after approximately 80-95% of metallic compound has reacted with the rosin and in adding the said catalyst at the bottom of the said reaction mixture.

2. In the process of preparing a metallic resinate by reacting a rosin-containing polymer with a metallic compound selected from the group consisting of the oxide and hydroxide under molten conditions and in the presence of a catalyst selected from the group consisting of acetic acid, acetic anhydride and metal salts of acetic acid, the improvement which consists in adding the catalyst to the reaction mixture only after approximately 80-95% of the metallic compound has reacted with the rosin-containing polymer and in adding the said catalyst at the bottom of the said reaction mixture.

3. In the process of preparing a metallic resinate by reacting rosin with a metallic compound selected from the group consisting of the oxide and hydroxide under molten conditions and in the presence of a catalyst selected from the group consisting of acetic acid, acetic anhydride and metal salts of acetic acid, the improvement which consists in adding glacial acetic acid to the reaction mixture only after 80-95% of the metallic compound has reacted with the rosin and in adding the said acid at the bottom of the said reaction mixture.

4. In the process of preparing a metallic resinate by reacting a rosin-containing polymer with a metallic compound selected from the group consisting of the oxide and hydroxide under molten conditions and in the presence of a catalyst selected from the group consisting of acetic acid, acetic anhydride and metal salts of acetic acid, the improvement which consists in adding glacial acetic acid to the reaction mixture only after 80-95% of the metallic compound has reacted with the rosin-containing polymer and in adding the said acid at the bottom of the said reaction mixture.

5. In the process of preparing a calcium resinate by reacting 100 parts by weight of rosin with 6 parts by weight of hydrated lime based on the weight of the rosin under molten conditions and in the presence of a catalyst selected from the group consisting of acetic acid, acetic anhydride and metal salts of acetic acid, the improvement which consists in adding the catalyst to the reaction mixture only after approximately 80-95% of the hydrated lime has reacted with the rosin in an amount equal to approximately 1.5 parts by weight based upon the weight of the resin and in adding the said catalyst at the bottom of the reaction mixture.

6. In the process of preparing a calcium resinate by reacting 100 parts by weight of a rosin-containing polymer containing approximately 33% of the dimer and having a melting point of 77° C. with 6.75 parts by weight of hydrated lime based on the weight of the rosin-containing polymer under molten conditions and in the presence of a catalyst selected from the group consisting of acetic acid, acetic anhydride and metal salts of acetic acid, the improvement which consists in adding the catalyst to the reaction mixture only after approximately 80-95% of the hydrated lime has reacted with the rosin-containing polymer in an amount equal to approximately 1.5 parts by weight based on the weight of said rosin-containing polymer and in adding the catalyst at the bottom of the reaction mixture.

7. In the process of preparing a calcium resinate by reacting 100 parts by weight of a rosin-containing polymer containing approximately 33% of the dimer and having a melting point of 79° C. with 6.4 parts by weight of hydrated lime based on the weight of the rosin-containing polymer under molten conditions and in the presence of a catalyst selected from the group consisting of acetic acid, acetic anhydride and metal salts of acetic acid, the improvement which consists in adding the catalyst to the reaction mixture only after approximately 80-95% of the hydrated lime has reacted with the rosin-containing polymer in an amount equal to approximately 1.5 parts by weight based on the weight of said rosin-containing polymer and in adding the catalyst at the bottom of the reaction mixture.

8. In the process of preparing a calcium resinate by reacting 100 parts by weight of a rosin-containing polymer containing approximately 33% of the dimer and having a melting point of 80° C. with 6.1 parts by weight of hydrated lime based on the weight of the rosin-containing polymer under molten conditions and in the presence of a catalyst selected from the group consisting of acetic acid, acetic anhydride and metal salts of acetic acid, the improvement which consists in adding the catalyst to the reaction mixture only after approximately 80-95% of the hydrated lime has reacted with the rosin containing polymer in an amount equal to approximately 1.5 parts by weight based on the weight of said rosin-containing polymer and in adding the said catalyst at the bottom of the reaction mixture.

9. In the process of preparing a calcium resinate by reacting 100 parts by weight of a rosin-containing polymer containing approximately 33% of the dimer and having a melting point of 81° C. with 5.9 parts by weight of hydrated lime based on the weight of the rosin-containing polymer under molten conditions and in the presence of a catalyst selected from the group consisting of acetic acid, acetic anhydride and metal salts of acetic acid, the improvement which consists in adding the catalyst to the reaction mixture only after approximately 80-95% of the hydrated lime has reacted with the rosin-containing polymer in an amount equal to approximately 1.5 parts by weight based on the weight of said rosin-containing polymer and in adding the said catalyst at the bottom of the reaction mixture.

10. In the process of preparing a calcium resinate by reacting 100 parts by weight of a rosin-containing polymer containing approximately 33% of the dimer and having a melting point of 82° C. with 5.6 parts by weight of hydrated lime based on the weight of the rosin-containing polymer under molten conditions and in the presence of a catalyst selected from the group consisting of acetic acid, acetic anhydride and metal salts of acetic acid, the improvement which consists in adding the catalyst to the reaction mixture only after approximately 80-95% of hydrated lime has reacted with the rosin-containing polymer in an amount equal to approximately 1.5 parts by weight based on the weight of said rosin-containing polymer and in adding the said catalyst at the bottom of the reaction mixture.

HARRY D. DARLINGTON.

REFERENCES CITED

The following references are of record in the file of this patent:

UNITED STATES PATENTS

| Number | Name | Date |
| --- | --- | --- |
| 1,884,407 | Romaine | Oct. 25, 1932 |
| 1,994,714 | Johnson et al. | Mar. 19, 1935 |
| 2,346,993 | Palmer et al. | Apr. 18, 1944 |
| 2,346,994 | Palmer et al. | Apr. 18, 1944 |

FOREIGN PATENTS

| Number | Country | Date |
| --- | --- | --- |
| 563,271 | Great Britain | Aug. 8, 1944 |

OTHER REFERENCES

Borglin et al., Industrial and Engineering Chemistry, vol. 36, pp. 752-756, August 1944.